United States Patent
Ueyoko

(10) Patent No.: US 8,151,849 B2
(45) Date of Patent: Apr. 10, 2012

(54) RADIAL AIRCRAFT TIRE WITH FLIPPER REINFORCEMENT

(75) Inventor: Kiyoshi Ueyoko, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 972 days.

(21) Appl. No.: 12/137,830

(22) Filed: Jun. 12, 2008

(65) Prior Publication Data

US 2009/0308518 A1 Dec. 17, 2009

(51) Int. Cl.
*B60C 15/06* (2006.01)
*B60C 15/04* (2006.01)

(52) U.S. Cl. ........ 152/531; 152/533; 152/538; 152/540; 152/542; 152/546

(58) Field of Classification Search .......... 152/531, 152/533, 538, 540, 542, 546, 543
See application file for complete search history.

(56) References Cited

U.S. PATENT DOCUMENTS

| | | | |
|---|---|---|---|
| 3,612,138 A * | 10/1971 | Ravenhall | 152/543 |
| 4,244,414 A | 1/1981 | Uemura et al. | |
| 5,085,260 A | 2/1992 | Ueyoko et al. | |
| 5,285,835 A | 2/1994 | Ueyoko et al. | |
| 5,435,370 A | 7/1995 | Ahmad et al. | |
| 5,509,455 A | 4/1996 | Warchol et al. | |
| 5,759,315 A | 6/1998 | Suzuki et al. | |
| 5,769,982 A | 6/1998 | De Loze de Plaisanc | |
| 5,988,247 A | 11/1999 | Tanaka | |
| 6,125,900 A * | 10/2000 | De Loze de Plaisance et al. | 152/531 |
| 6,491,079 B2 | 12/2002 | Kato et al. | |
| 6,536,495 B1 | 3/2003 | Close et al. | |
| 6,622,766 B1 | 9/2003 | Baldwin, Jr. | |
| 6,648,041 B2 | 11/2003 | Ueyoko | |
| 6,655,431 B2 | 12/2003 | Kato et al. | |
| 6,802,351 B1 | 10/2004 | Kimura et al. | |
| 2002/0195187 A1 | 12/2002 | Roget et al. | |
| 2007/0221307 A1 | 9/2007 | Yano et al. | |
| 2008/0295946 A1 * | 12/2008 | Kraus et al. | |

FOREIGN PATENT DOCUMENTS

| | | |
|---|---|---|
| DE | 10 2006 011 158 A1 * | 9/2007 |
| EP | 1864828 | 12/2007 |
| GB | 2 218 676 A * | 11/1989 |
| JP | 62152907 | 7/1987 |
| JP | 10250323 | 9/1998 |
| JP | 2000185515 | 7/2000 |
| JP | 2007022113 | 1/2007 |
| JP | 2007022115 | 1/2007 |
| JP | 2007069654 | 3/2007 |
| JP | 2007246026 | 9/2007 |

* cited by examiner

*Primary Examiner* — Adrienne C. Johnstone
(74) *Attorney, Agent, or Firm* — David L King

(57) ABSTRACT

A pneumatic tire for mounting on an aircraft wheel has a radial carcass and flipper reinforcement. The tire has a pair of bead cores, at least two or more axially inner plies greater than or equal to, extending between the bead cores, a crown reinforcement radially outward of the plies having a maximum belt width BW, and at least one flipper reinforcement wrapped around each bead core. Each bead core has a radially extending cross sectional length B. Each flipper reinforcement extends along an inner surface of the bead core to the axially inner end located in an area that is between 0.01 BW to 0.25 BW as measured from the belt edge toward a centerline of the tire preferably in the range of 0.05 BW to 0.125 BW and wherein one flipper reinforcement has an axially outer end lower than the top of the bead core.

5 Claims, 6 Drawing Sheets

RADIAL AIRCRAFT TIRE WITH FLIPPER REINFORCEMENT

FIELD OF THE INVENTION

The present invention relates to an improved radial aircraft tire. More particularly to an improved carcass structure for a radial aircraft tire.

BACKGROUND OF THE INVENTION

The radial carcass reinforcements of such tires generally comprise several plies of textile cords, which are anchored in each bead to at least one bead wire and generally have a single bead wire. The reinforcing elements of these reinforcements are wound around said bead wire from the inside to the outside, forming turn-ups, the respective ends of which are spaced radially from the axis of rotation of the tire. The severe conditions under which airplane tires are used are such that the life of the beads is short, particularly in the area of the turn-ups of the carcass reinforcement.

A substantial improvement in performance is obtained by the separating of the plies of the carcass reinforcement into two groups. The first group comprises the plies of the carcass reinforcement which are axially towards the inside in the region of the beads, these plies being then wound around a bead wire in each bead from the inside to the outside of the tire. The second group is formed of at least one axially outer ply in the region of the beads, which ply is generally wound around the bead wire from the outside to the inside of the tire. Such arrangements are known; for instance, in U.S. Pat. No. 4,244,414.

The life of beads formed in this manner can be improved by the presence in each bead of an additional reinforcement ply, wound around the bead wire and thus forming an axially outer leg and an axially inner leg, said reinforcement ply, also known as an inner flipper, being the ply closest to the rubber filler, radially above the anchoring bead wire. A tire structure of this type is shown in U.S. Pat. No. 5,285,835. In U.S. Pat. No. 5,769,982, the life of the beads of airplane tires can be further improved, particularly when they are subjected to heavy overloads which can result in a crushing of the order of 50% and more of their height, by having the arrangement of the ends of the turned-up portions or turn-ups of the inner carcass plies and the ends of the legs of the inner flipper with respect to the radial position of the radially upper end of the rubber filler located above the anchoring bead wire and the filler.

In accordance with U.S. Pat. No. 5,769,982: in that invention, a prior art airplane tire, inflated to a high pressure, having a tread, a crown reinforcement, and a radial carcass reinforcement having at least two axially inner plies of textile cords wound around a bead wire in each bead from the inside to the outside forming turn-ups and at least one axially outer ply of textile cords superimposed on the inner plies below the crown reinforcement and along the turn-ups in said beads. The bead wire is radially surmounted by a filler of vulcanized rubber mix, having the shape substantially of a triangle, the apex of which radially furthest from the axis of rotation is at a distance D from a straight line parallel to said axis, passing through the geometrical center of the circle circumscribed on the cross-section of the anchoring bead wire, known as the reference line, and also having at least one inner flipper wound around the bead wire to form an axially inner leg and an axially outer leg which are axially adjacent to the filler above the bead wire, characterized by the fact that the end of the axially outer leg of the inner flipper is located at a radial distance $L_g$ from the reference line such that $L_E$ is between 0.40 D and 0.80 D; the end of the turn-up of the inner carcass ply arranged axially furthest to the inside is located at a distance $H_A$ from the reference line such that $H_A$ is between 0.15 D and 0.50 D, and by the fact that the ends respectively of the inner leg of the inner flipper and of the turn-ups of the inner carcass ply or plies which are axially furthest to the outside as is illustrated in FIG. 1.

While this construction is durable, it limits the number of carcass plies that can be provided in the bead area and the extended length of the flipper means that the outer plies being turned down around the bead and the inner plies are spaced from the natural ply path of the tire in the region of the flipper. This spacing, while believed desirable, results in one less ply being available in the structure and in the case of very large aircraft the tire structure ideally may require the use of another ply which is effectively precluded by the use of this extended length flipper.

In an earlier invention, U.S. Pat. No. 6,648,041 B1, I proposed an improved aircraft tire design employing a flipper having both an axially inner end and an axially outer end of the flipper that extend only a distance less than the radially outermost extent of a bead filler 40 which was at a distance D as measured from the center of a bead core 30. This was a marked improvement over the then existing prior art tires using longer flippers. I recently discovered a further improvement to my earlier invention which has the added benefits of increased strength wherein the flipper has one low ply turn-up end on the axially outer side of the bead wire, the other axially inner end terminating much higher than those in the prior art.

It is an object of the present invention to provide a lightweight efficient tire structure having superb durability.

It is a further object of the present invention to provide an improved bead structure wherein the use of inside turn-up plies and outside turndown plies is optimized by the placing of the plies close to the natural ply path.

SUMMARY OF THE INVENTION

A pneumatic tire for mounting on an aircraft wheel for use on an aircraft has a radial carcass and flipper reinforcement. The tire has a pair of bead cores, a number of at least two axially inner plies extending between the bead cores, a crown reinforcement radially outward of the plies having a maximum belt width BW, and at least one flipper reinforcement wrapped around each bead core. Each bead core has a radially extending cross sectional length P. The radial carcass plies are preferably made of textile reinforcing elements or cords. The at least one flipper reinforcement, similarly, is reinforced by textile reinforcing elements or cords. Each flipper reinforcement has an axially inner end and an axially outer end. The axially outer end is turned up not higher than 1.4 times the cross sectional length P of the bead core as measured radially outwardly from the bottom of the bead core perpendicular to the axis of tire rotation. Each flipper reinforcement extends along an axially inner surface of the bead core to the axially inner end located in an area that is between 0.01 BW to 0.25 BW as measured from the belt edge toward a centerline of the tire, preferably in the range of 0.05 BW to 0.125 BW. The crown reinforcement has one or more belt ply layers or strips reinforced by cords oriented relative to the circumferential direction at an angle of between 0 degrees and 45 degrees with respect to the equatorial plane of the tire. The belt layers have a maximum belt width of BW as measured from each belt edge. The tire further has a tread radially outward of the crown reinforcement. Preferably each flipper reinforcement has the axially outer end located in area that is lower than the radial height of the wheel flange height of the aircraft wheel to which the tire is mounted. In another alternative embodiment a flipper reinforcement has an axially outer end located in area that is lower than the top of the bead core. In a second alternative embodiment, the tire employs two flipper reinforcements extending from the bead core to under the belt structure. In a preferred embodiment the bead cores are formed by a plurality of sheath wires enveloping a central core that is made of a light weight metal alloy material having a weight less than steel.

DEFINITIONS

The following definitions are controlling for the disclosed invention

"Apex" means a non-reinforced elastomer positioned radially above a bead core.

"Aspect ratio" of the tire means the ratio of its section height (SH) to its section width (SW) multiplied by 100% for expression as percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about a 25 degree to 50 degree angle with respect to the equatorial plane of the tire. Cords run at opposite angles in alternate layers.

"Carcass" means the tire structure apart form the belt structure, tread, under tread, and sidewall rubber over the plies, but including the beads.

"Circumferential" means lines or direction extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and pressing through the center of its tread.

"Flipper" means a reinforced fabric wrapped about the bead core.

"Footprint" means the contact patch are area of the tire tread with a flat surface at zero speed and under normal load and pressure.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Ply" means a continuous layer or rubber-coated parallel cords.

"Radial" and "radially" means a direction radially toward or away from the axis of rotation of the tire.

"Radial-ply tire" means a belted or circumferentially-restricted pneumatic tire in which the ply cords which extend from bead to bead are laid at cord angles between 65 degrees and 90 degrees with respect to the equatorial plane of the tire.

"Section height (SH)" means the radial distance from the nominal rim diameter of the tire at its equatorial plane.

BRIEF DESCRIPTION OF THE DRAWINGS

The invention will be described by way of example and with reference to the accompanying drawings in which.

DETAILED DESCRIPTION OF THE INVENTION

Figure 1:
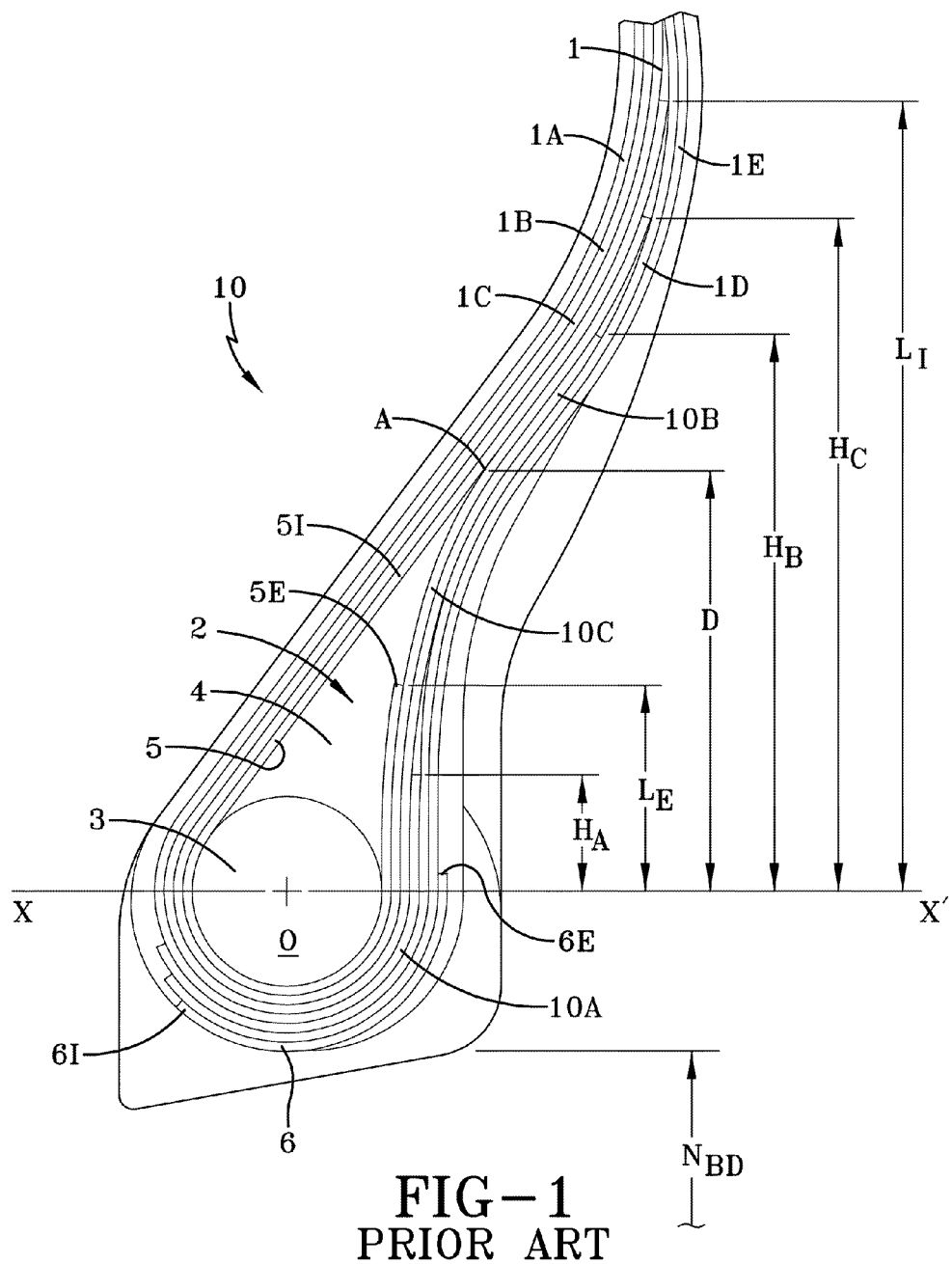
FIG. 1 is a partial cross-sectional view of the prior art tire bead as described in U.S. Pat. No. 5,769,982.

With reference to FIG. 1, a diagrammatic view in cross section of a prior art tire bead in accordance to U.S. Pat. No. 5,769,982 is shown.

The example described is that of a prior art tire 10 of standard size 36×11.0 R 18 (standards of the Tire and Rim Association). The carcass reinforcement 1 is formed of five plies 1A to 1E of radial textile cords. Radial cords, as the term is used herein, are cords which form with the circumferential direction of the tire angles which may be within the range of 90 degrees+/−10 degrees. Among these five plies, three axially inner plies 1A, 1B, 1C are wound in each bead 2 around a bead wire 3 shown in the drawing as having a circular cross section, extending from the inside to the outside of the tire 10 in order to form turn-ups 10A, 10B, 10C.

The cross section of the bead wire 3 is surmounted radially towards the outside by a strip or filler 4 of elastomeric mix having substantially the shape of a triangle, the apex A of which, radially furthest from the axis of rotation of the tire, is located at a distance D from a reference line XX'. The reference line is parallel to the axis of rotation and through the geometrical center O of the circle is circumscribed on the cross section of the bead wire 3, which circle, in the case described, is identical with the cross section itself.

The turn-up 10A of the inner carcass ply 1A axially furthest towards the inside has its end spaced radially form the line XX' by the amount $H_A$, which is equal, in the case studied, to 12 mm, namely 0.33 times the distance D, D being equal to 36 mm. As to the ends of the inner plies 10B and 10C, respectively, they are located radially above the apex A of the filler 4 at distances $H_B$ and $H_C$ of 55 mm and 68 mm, respectively.

The same is true of the radial end of the axially inner leg 51 of a flipper 5, which can be formed of radial textile cords identical to the carcass ply cords (but which may also be different), which end is located at a radial distance $L_I$ of 80 mm from the line XX', a distance greater than the distance $H_B$ and $H_C$ referred to above, the three ends thus arranged radially above the apex A being staggered between said apex and the point of the sidewall where the tire has a maximum axial width. As to the radial end of the axially outer leg 5E of the inner flipper 5, it is spaced from the line XX' by the radial distance $L_g$ equal to 0.58 D and greater than the distance $H_A$.

The two carcass plies 1D and 1E, herein caller outer plies, cover the turn-ups 10A, 10B, 10C of the inner carcass plies 1A to 1C axially on the outside. The plies 1D and 1E are wound around the bead wire 3 over a portion or circular arc corresponding to an angle at the center of the circle circumscribed on the bead wire 3 equal to at most 180 degree, so that the ends of these plies 1D and 1E are situated radially below the reference line XX'.

The tire bead 2 is supplemented by a reinforcement ply 6 or outer chafer of radial textile cords, said ply permitting a better distribution of the pressures between the tire and its service rim, as well as assuring protection of the carcass plies against injury upon mounting.

The axially outer end 6E of said chafer is slightly above (about 2 mm) the reference line XX', while its axially inner end 61 is below said line.

This prior art structure has been tested on a dynamometric flywheel under punishing conditions for beads of this type, these conditions corresponding to a simulation of travel on a runway (10160 kg, 4572 m, 46 km/hr), followed by a take-off from 0 to 300 km/hr, the pressure conditions being such that the crushing of the tire under the load of 10160 kg is 50%+/−2% of its height.

Comparison with another prior art tire of the same size, 36×11.0 R 18, comprising the same number of carcass plies and inner and outer flipper and chafer, the inner carcass ply furthest to the inside having a turn-up end of which is located above the apex A, and the outer leg of the inner flipper having its end below said apex, clearly and unexpectedly shows the improvement, in the life of the beads, since the tires of the invention, under the above conditions, have completed on the average 35% more runway-take-off cycles.

In contrast, a prior art tire 100 made according to U.S. Pat. No. 6,648,041 is illustrated in a diagrammatic view in cross-section FIG. 2.

The example shown is that of a tire of standard size 50×20.0 R22 (standard of the Tire and Rim Association).

Figure 2:
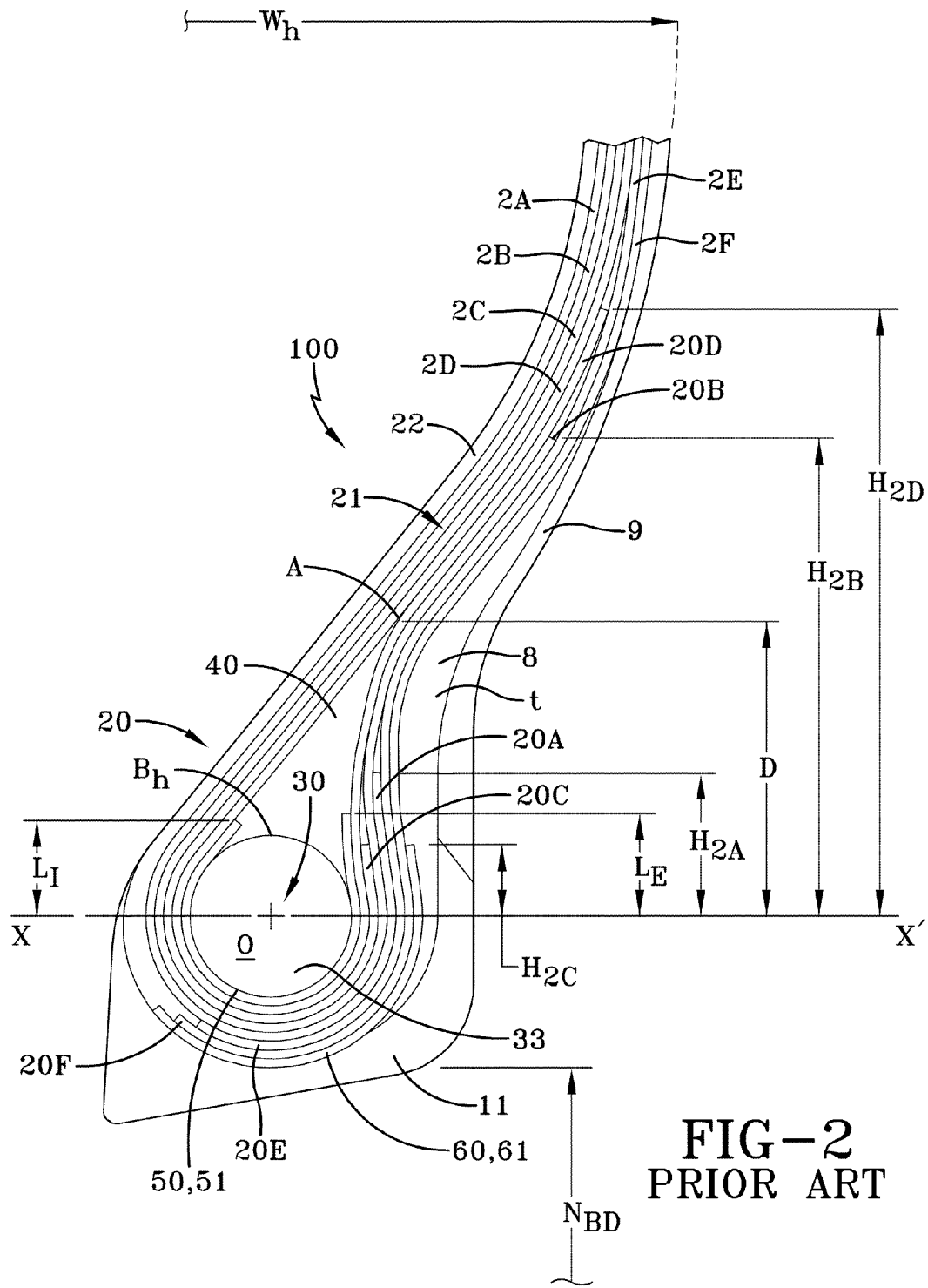
FIG. 2 is a partial cross sectional view of my prior art tire bead as described in U.S. Pat. No. 6,648,041 B1.

With reference to FIG. 2, the carcass reinforcement 20 is formed of six plies 2A to 2F of radial textile cords 21. Among these six plies, four axially inner plies 2A, 2B, 2C and 2D are wound in each bead 30 around a bead core 33 shown in the drawing having circular cross section. These four plies extend from the inside to the outside of the tire in order to form turn-ups 20A, 20B, 20C and 20D terminating at radial heights $H_{2A}$, $H_{2B}$, $H_{2C}$ and $H_{2D}$ respectively. The carcass reinforcement is radially outward of the innerliner 22 of tire 100. Two axially outer carcass plies 2E and 2F extend to ends 20E and 20F below bead core 33, a chipper strip 60 reinforced by cords 61 covers the ends 20E and 20F, a rubber chaffer 11 covers the chipper and extends to the sidewall rubber 9, a filler 8 and the chaffer 11 as illustrated.

Outward of the bead core 33 is a strip or filler 40 of elastomeric material having a substantially triangular shape extending to an apex A radially furthest from the axis and located a distance D from a reference line XX'. As was shown in FIG. 1 the reference line is also parallel to the axis of rotation and through the geometric center O, of the circle circumscribed on the cross section of the bead core 33.

The turn-up 20A of the inner carcass ply 2A axially furthest toward the inside has its end spaced radially from line XX' by the amount $H_{2A}$, which is, for this exemplary tire size, equal to 29 mm or 0.6 times the distance D, D being equal 48 mm.

As shown, the tire of FIG. 2 has a nominal bead diameter $N_{BD}$ of 22.00 inches (558.8 mm) and a maximum section width Wh.

The flipper 50 having ends located well below the apex A means there was an opportunity to keep the inner plies and the outer plies much closer to the optimum natural ply path. The cords 51 of the flipper were made equal to or smaller in diameter than the cords 21 of the plies.

The flipper 50, which was formed of radial textile cords 51 similar to those of plies, is located with an inner end $L_g$ slightly above the height $B_E$ of the bead core 33 and an outer end $L_E$ was also shown slightly above the bead core 33. The ends $L_I$, $L_E$ satisfy a relationship wherein $B_E<L_I$ and $L_E 0.7$ D as measured from the centerline XX' of the bed core 33. To minimize the space occupied by the flipper 50 the cords 51 can be made of a diameter smaller than the ply cords 21.

As shown both prior art tires 10 and 100 have a flipper reinforcement that occupies a space wrapped around the bead core that prevents the axially inner plies and the axially outer plies from being closer to the optimal natural ply path as a result of the thickness of the flipper reinforcement. Regardless of the diameter of the cords 51 of the flipper reinforcement it is clear that a compromise is made by the use of such flippers. This compromise means that the plies themselves in an area stressed by the beads during severe loading conditions are offset from the optimal location that one would prefer the carcass ply cords to be situated in. As can easily be appreciated the additional endings of these flippers in this sensitive bead region reduces the durability of the tire.

Figure 3:
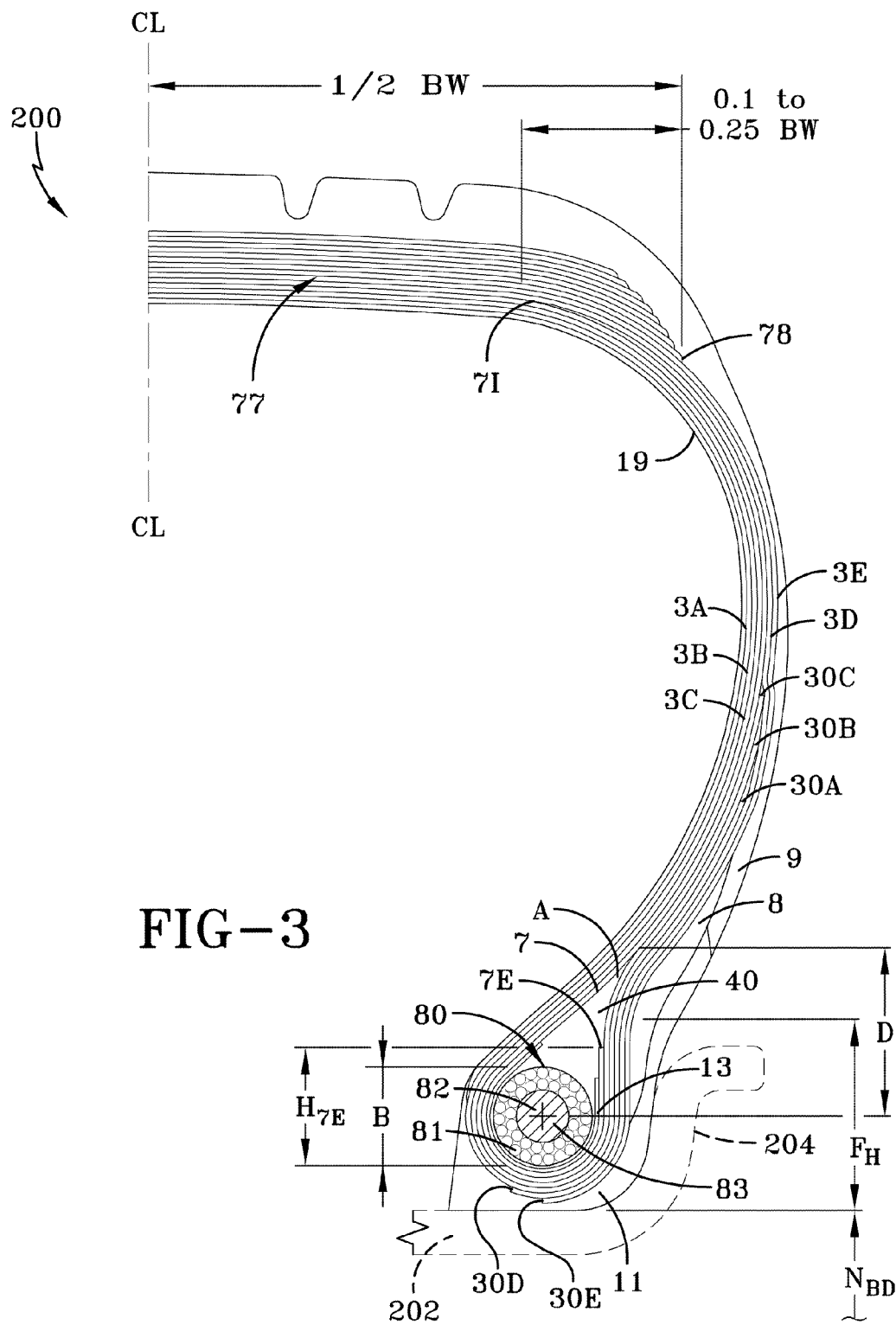
FIG. 3 is a partial cross sectional view of the tire made according to the present invention.
Figure 4:
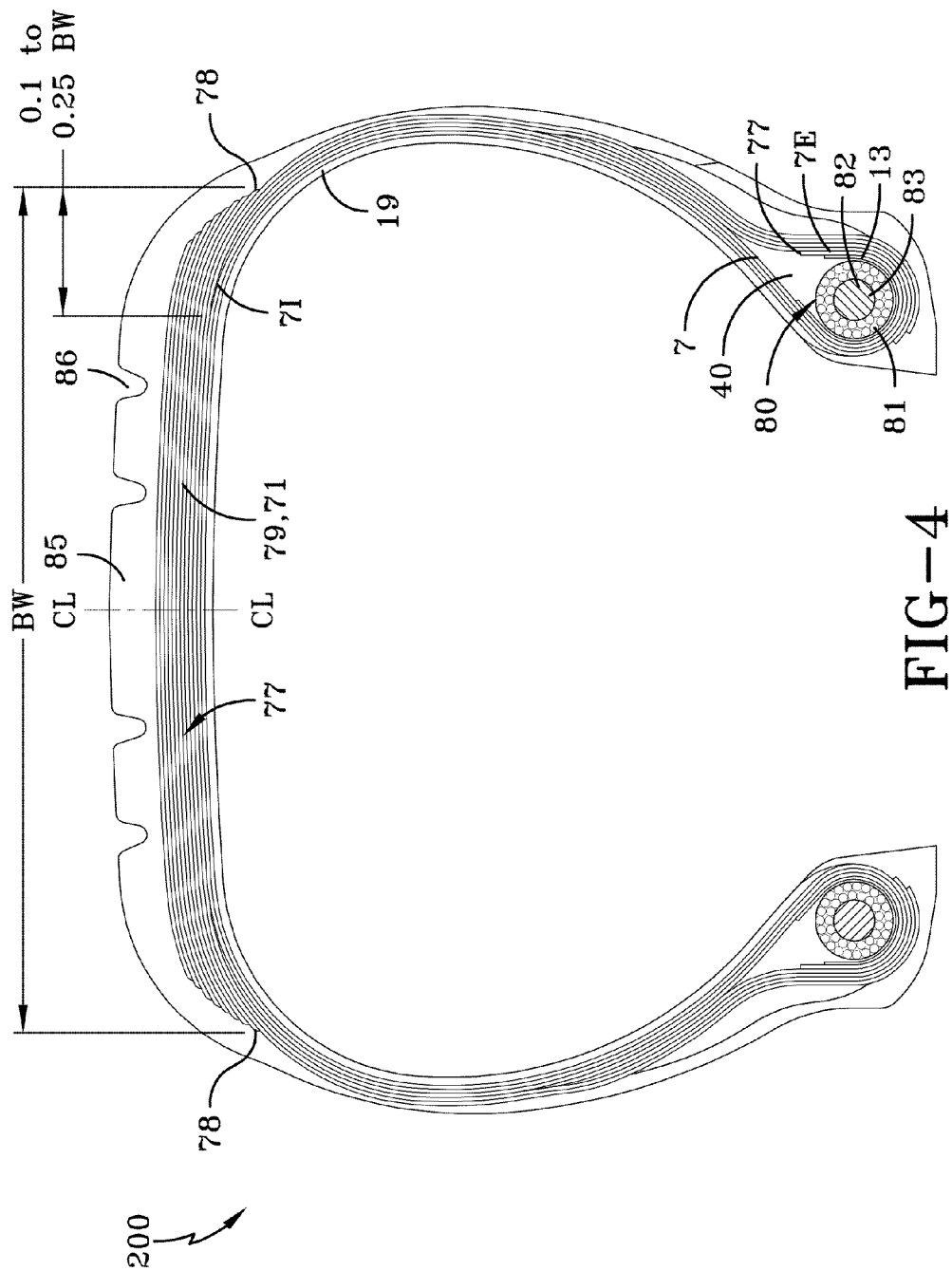
FIG. 4 is a cross-sectional view of the tire of FIG. 3.

With reference to FIGS. 3 and 4, the tire 200 of an exemplary size H 37.5×12.0 R 19, having a 20 ply rating made according to the present invention is illustrated. The exemplary tire 200 has a rated load of 25,600 lbs at a pressure of 212 psi. The tire 200 has an air impervious inner liner 19, at least two axially inner plies, as shown three of these plies 3A, 3B and 3C extend across the crown region of the tire 200 into the bead area 80 and wrap about the bead cores 82 extending to terminal ends 30A, 30B, 30C. These terminal ends are then covered by axially outer plies 3D and 3E which extend from bead to bead to ends 30D and 30E that lie basically under the bead core 82 as illustrated. The tire 200 further has an elastomeric filler material 8 and a chafer material 11 as shown and a sidewall material 9 covering these axially outer plies 3D and 3E. Directly adjacent to the bead core 82 is an optional thin green rubber layer or thin cord reinforced flipper 13 that wraps around the bead core 82. Wrapped around the thin layer 13 is a flipper reinforcement 7. As shown the flipper reinforcement 7 extends from an axially inner end 7I lying between the axially outer plies 3D, 3E and the axially inner plies 3A, 3B, 3C in a region directly under a crown reinforcement 77. From this upper ending 7I of the flipper reinforcement, the flipper 7 extends radially inwardly along the sidewall of the tire 200 and wraps around the bead core 82 extending to an axially outer end 7E that is preferably well below the apex A of the bead filler 40 as illustrated. As shown in dashed lines, the wheel 202 to which the tire 200 is to be mounted has a wheel flange 204 with a radial height $F_H$ as indicated. Preferably, the turn-up ending 7E is in the area of the wheel flange height. The bead core 82 has a cross sectional length B preferably the turn-up ending 7E does not exceed a dimension that is 1.4 times the cross sectional length B of the bead core 82 as measured outwardly from the bottom of the bead core 82 perpendicular to the axis of rotation of the tire 200.

As shown, the turn-up ending 7E of the flipper 7 is located at or below the wheel flange height $F_H$. In an alternative embodiment, shown in FIG. 5, the turn-up end 7E extend radially to a height $H_{7E}$ below the bead core cross sectional length B.

With reference to FIG. 4, the entire cross section of the tire 200 is illustrated. As shown in the cross section, the crown reinforcement 77 is formed of several belt layers 79 and has an axial maximum belt width BW as measured between the maximum width belt edges 78 of the crown reinforcement 77.

As shown the crown reinforcement 77 has cords 71 that are aligned at an angle between 0 and 45 degrees relative to the circumferential direction. Radially outward of the crown reinforcement 77 is a rubber tread 85 having a plurality of circumferential grooves 86 for water drainage. As shown it is important that the flipper reinforcement ending 7I below the belt layers 79 with the axially inner end extending inwardly between 0.1 BW to 0.25 BW as measured from the belt edge toward the center line of the tire 200. More preferably the ending 7I lies in the range between 0.05 and 0.125 of the belt edge 78. In this way on each side of the tire 200, the flipper 7 extends under a belt edge 78 and wraps around the bead core 82 thereby securing both ends 7I and 7E of the flipper reinforcement enabling the flipper reinforcement 7 to become a structural member in the sidewall region of the tire 200, as seen under severe loading test condition requirements wherein the tire 200 is pressurized greater than 4 times its normal rated pressure the flipper reinforcement 7 acts as an additional reinforcement added to the carcass plies and provides additional strength in the sidewall region. The advantage of this construction is that the flipper 7 does not extend across completely the crown region of the tire 200 and therefore doesn't extend very far past the belt edge 78, this eliminates the additional weight of an additional full inner ply as was required when using short flipper reinforcements as found in my earlier prior art tire 100 as previously described. The advantages of the present invention are numerous, the flipper reinforcement 7 becomes a structural element in the tire 200 while reducing weight in that the flipper reinforcement 7 unlike a ply terminates under the belt edge 78 and does not extend across the crown region of the tire 200, secondarily in the bead region 80 along the axially inner side of the tire 200 there is no axially inner flipper ending there is only a terminal ending at the axially outer side of the bead 80 and this ending 7E is positioned in a strategically low region close to the bead core 82 to take the advantage of my earlier work. This tire 200 enables that short ending 7E to avoid the region adjacent the apex A wherein the axially outer plies and turn-ups can be positioned more closely to the natural ply path of the tire 200. This creates a much smoother transition in the bead 80 and increases the durability of this particularly sensitive region of heavily loaded aircraft tires.

Another weight savings of the tire 200, 200A and 200B as illustrated has the bead core 82 provided with a central core 83 of a light weight metal alloy material having a weight less than steel as taught in my U.S. Pat. No. 6,571,847 B1. Preferably the material is aluminum or another light weight alloy and this central core 83 of the bead core 82 is then wrapped by a plurality of sheath wires 81 which envelope the central core 83, the sheath wires 81 preferably are steel cords or wires to provide strength, in this way the structural integrity of the bead core 82 is greatly enhanced relative to its weight and provides additional light weight benefits.

As shown the ply cords 3A through 3F are preferably an 1890 denier/3 nylon construction, however the ply cords 3A through 3F as well as the flipper reinforcement cords can be made any known material preferably of nylon, however other materials such as aramid, polyketones, can be employed.

An exemplary test tire 200 made according to the present invention in a size H 37.5×12.0 R 19 has a ply rating of 20 and a rated load of 25,600 lbs at a pressure of 212 psi. The tire 200 has a weight savings of 1.5 lbs per tire when compared to a prior art tire of the same size using an additional full ply with a short flipper as taught in my earlier U.S. Pat. No. 6,648,041.

When these tires were tested for endurance durability, the tire 200 of the present invention maintained a substantial improvement in terms of ply edge looseness in the bead regions.

In a second critical comparison, an over pressure test was conducted wherein the tires must survive an over pressure of at least 4 times the rated pressure which in the H 37.5×12.0 R 19 tire size is an over pressure of 848 psi minimum. In this test the tire 200 according to the present invention and the prior art tire both survived the over pressure test exceeding the required 848 psi minimum. The tires when tested to burst pressure were remarkably almost identical in strength only differing by 2 psi and exceeding the 4 times over pressure by well over 25 percent providing a very good margin of strength.

Figure 5:
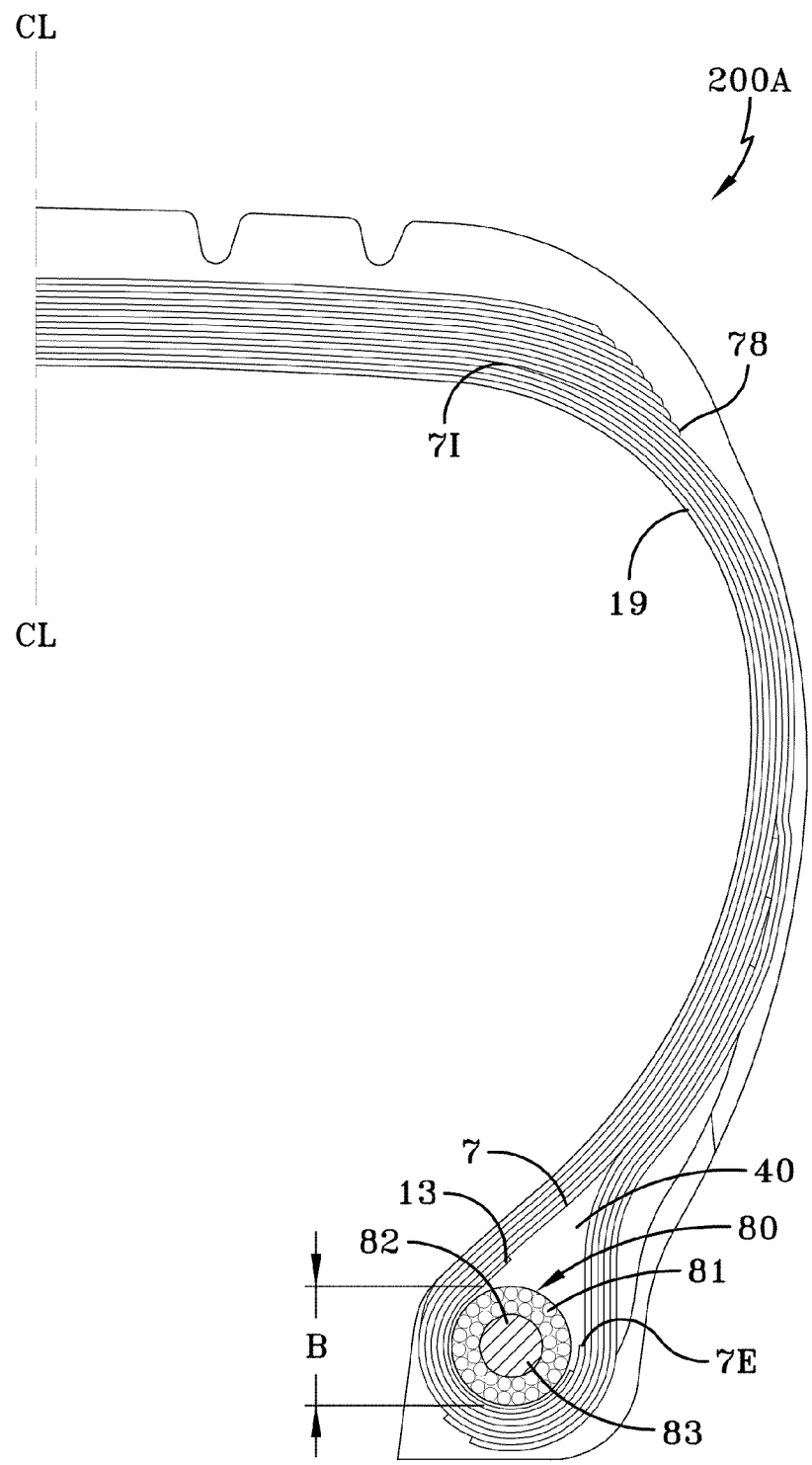
FIG. 5 is a partial cross-sectional view of an alternative embodiment tire made according to the present invention.

In FIG. 5, an alternative embodiment tire 200A is shown wherein the axially outer turn-up end 7E of the flipper 7 extends to a location below the top bead core 82 as shown at or below the center of the bead core 82.

Figure 6:
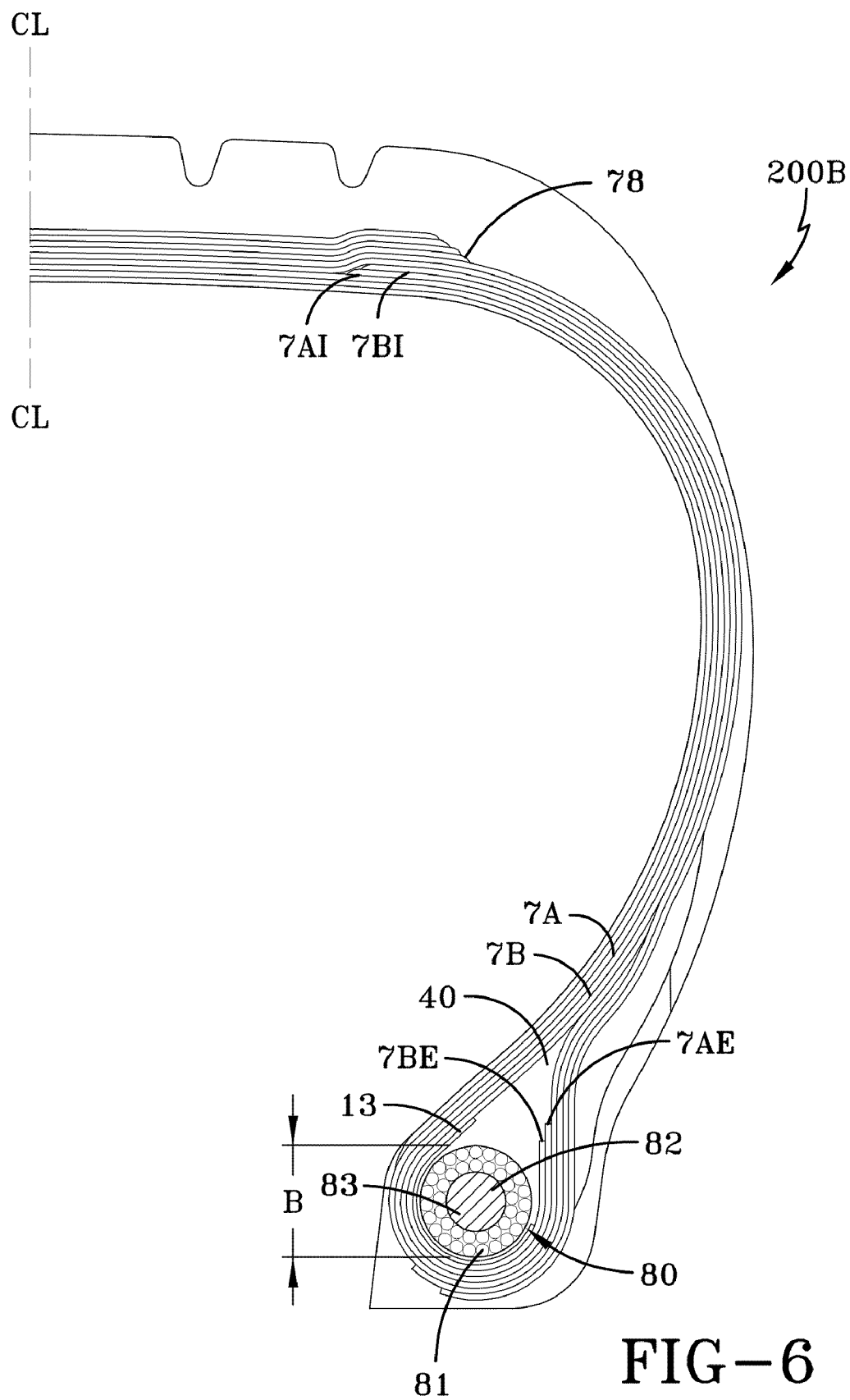
FIG. 6 is a second alternative embodiment tire.

The tire 200 according to the present invention can be made with one or more of these flippers as shown in FIG. 6, an alternative embodiment tire 200B has two such flippers 7A and 7B each extending on the axially inner side from the bead core 82 to a radially outer ends 7AI and 7BI under the belt edge 78. Each additional flipper 7B is capable of replacing a fully axially inner ply.

In FIG. 6 the second alternative embodiment tire 200 is shown employing two flippers 7A and 7B with the axially outer ends 7AE and 7BE staggered and located slightly above the bead core 80. In this design each flipper 7A and 7B extends from the bead core on the axially inner side to under the belt edge 78. Each flipper 7A and 7B is able to replace a fully axially inner ply and provide additional weight savings without sacrificing strength.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire for mounting on an aircraft wheel for use on an aircraft having a radial carcass and flipper reinforcement, the tire comprising:

a pair of bead cores, each bead core having a radially extending cross sectional length;

a number of axially inner plies greater than or equal to two extending between said bead cores said radial carcass reinforcement plies having textile reinforcing elements;

a crown reinforcement having one or more belt ply layers or strips reinforced by cords oriented relative to the circumferential direction at an angle of between 0 degrees and 45 degrees with respect to the equatorial plane of the tire, the belt layers having a maximum belt width of BW as measured from each belt edge; and at least one flipper reinforcement wrapped around each bead core, the at least one flipper reinforcement having an axially inner end and an axially outer end, the axially outer end being turned up not higher than 1.4 times the cross section length of bead core as measured radially outwardly from bottom of the bead core perpendicular to the axis of tire rotation and wherein each flipper extends along an axially inner surface of the bead core to the axially inner end located in area that is between 0.01 BW to 0.25 BW as measured from the belt edge toward a centerline of the tire and wherein one flipper reinforcement has the axially outer end located in area that is lower than the top of the bead core.

2. The pneumatic tire of claim 1 further comprising:
a tread, the tread lying radially outward of the crown reinforcement.

3. The pneumatic tire of claim 1 further comprising a pair of bead portions each provided therein with one of said bead cores, the bead cores formed by a plurality of sheath wires enveloping a central core that is a light weight metal alloy material having a weight less than steel.

4. The pneumatic tire of claim 1 wherein at least one flipper reinforcement axially inner end is located in area that is 0.05 BW to 0.125 BW.

5. The pneumatic tire of claim 1 comprises two flipper reinforcements, each flipper reinforcement wrapped around each bead core, the flipper reinforcements having an axially inner end and an axially outer end, the axially outer end being turned up not higher than 1.4 times the cross section length of bead core as measured radially outwardly from bottom of the bead core perpendicular to the axis of tire rotation and wherein each flipper extends along an axially inner surface of the bead core to the axially inner end located in area that is between 0.01 BW to 0.25 BW as measured from the belt edge toward a centerline of the tire.

* * * * *